Sept. 9, 1924.  
B. H. COZINE  
CURTAIN FOR AUTOMOBILE TOPS AND THE LIKE  
Filed Aug. 19, 1921  
1,508,165  
4 Sheets-Sheet 4
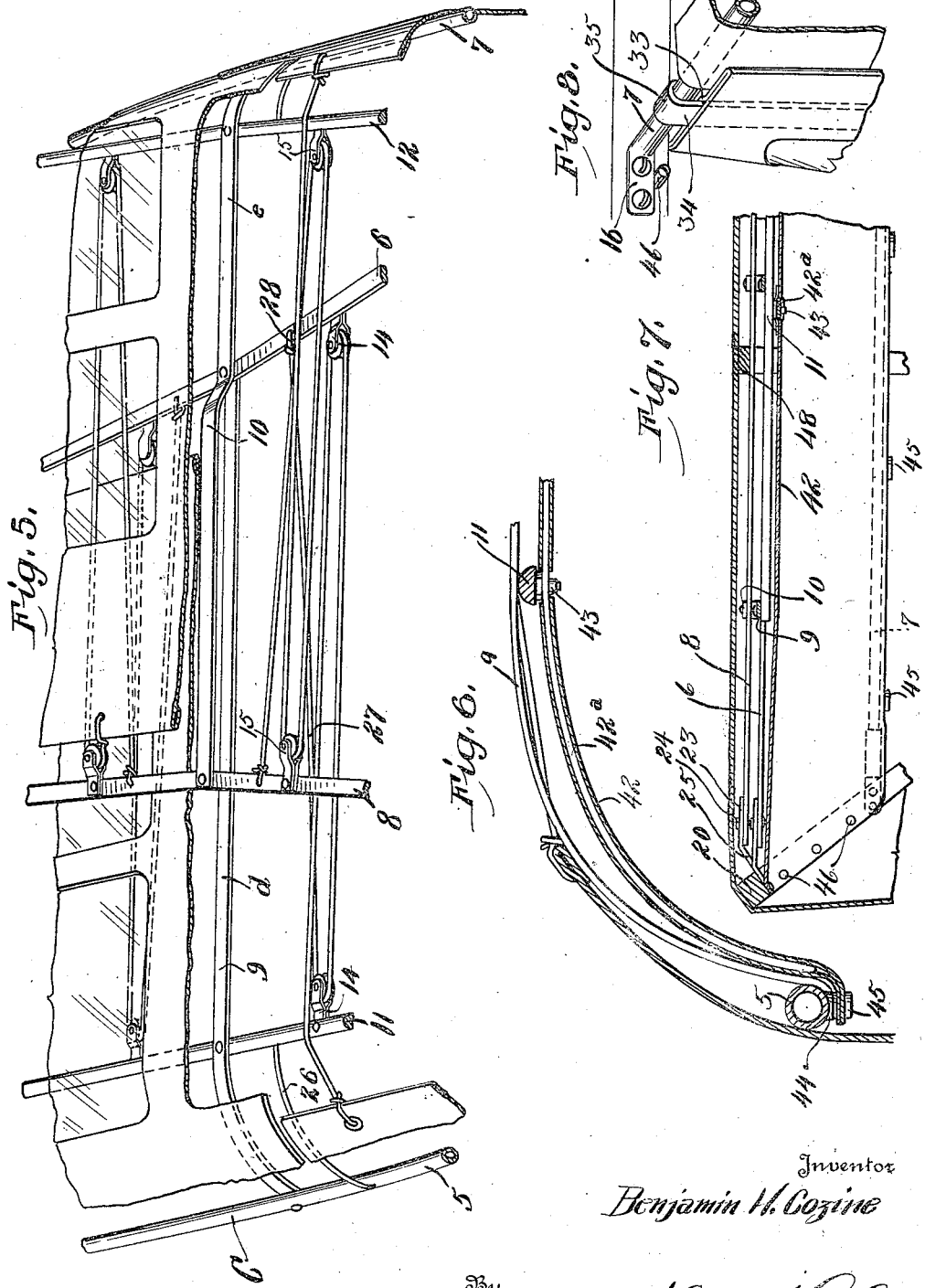
Inventor  
Benjamin H. Cozine  
By  
Attorney Patented Sept. 9, 1924.

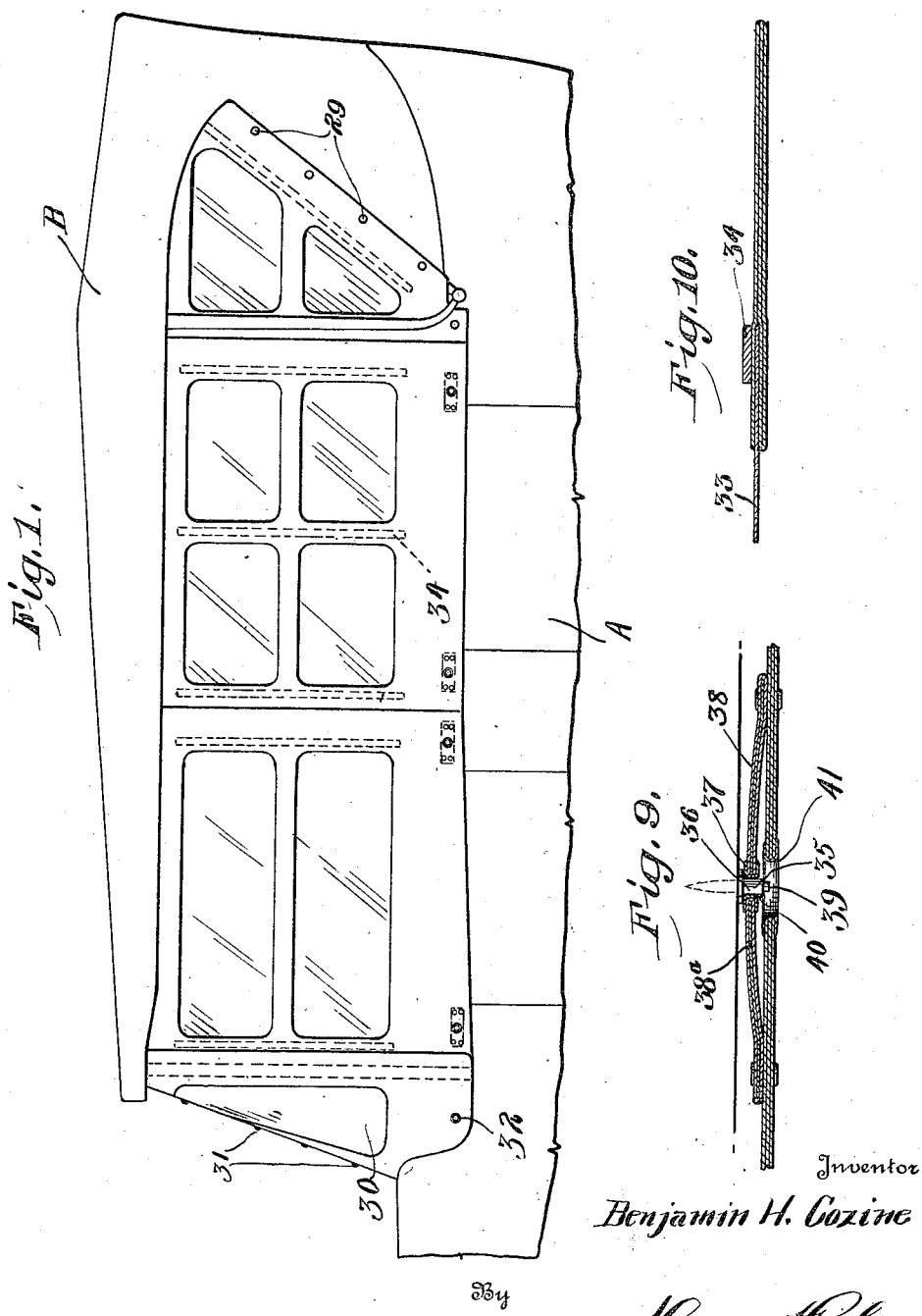

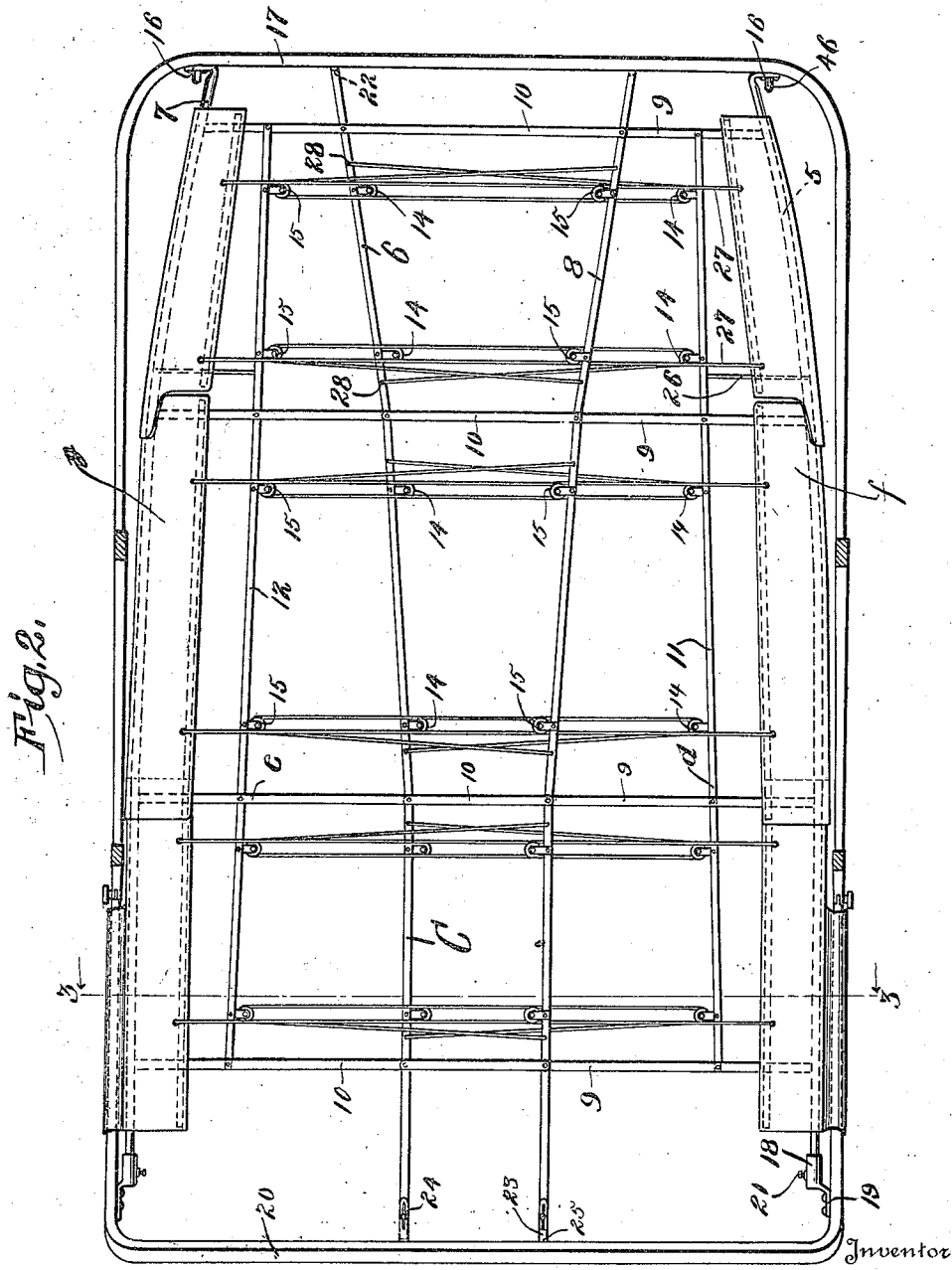

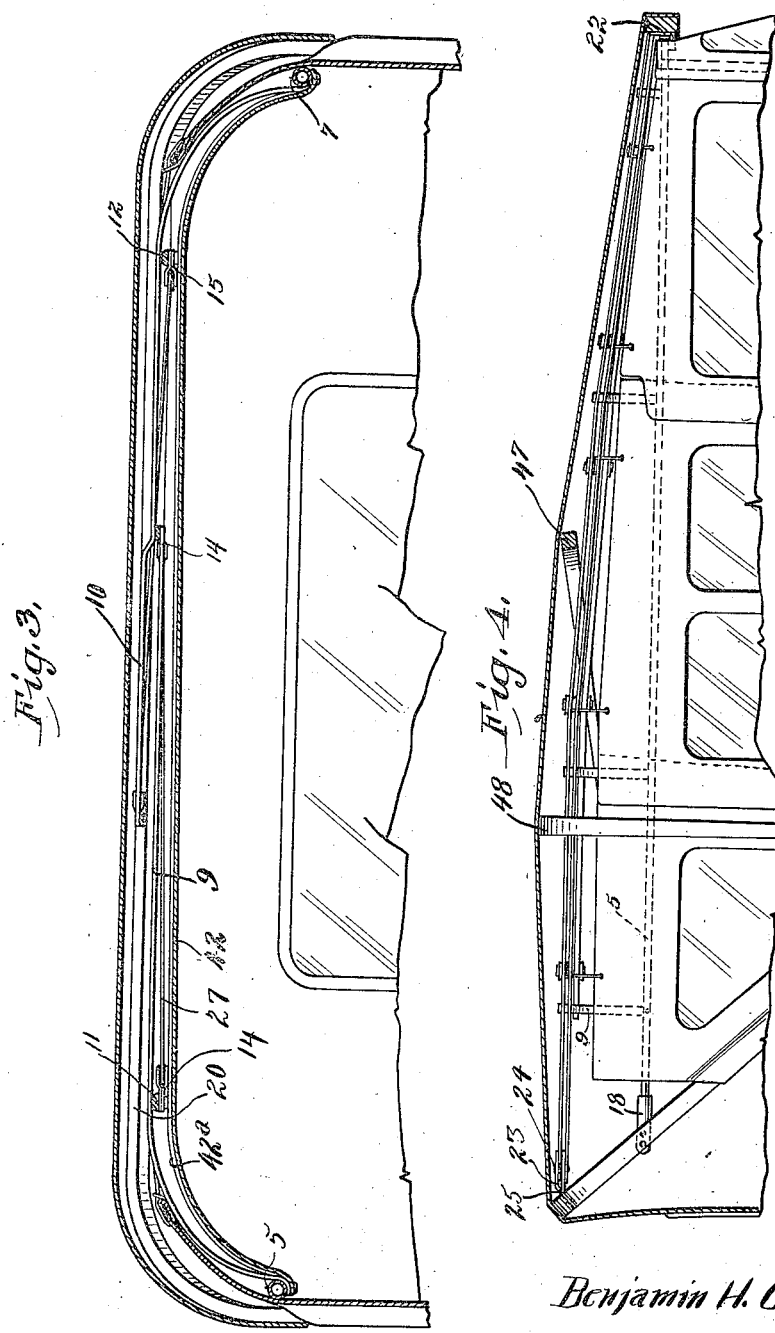

1,508,165

UNITED STATES PATENT OFFICE.

BENJAMIN H. COZINE, OF LOUISVILLE, KENTUCKY.

CURTAIN FOR AUTOMOBILE TOPS AND THE LIKE.

Application filed August 19, 1921. Serial No. 493,510.

*To all whom it may concern:*

Be it known that I, BENJAMIN H. COZINE, a citizen of the United States of America, and a resident of Louisville, Kentucky, have invented certain new and useful Improvements in Curtains for Automobile Tops and the Like, of which the following is a specification.

This invention is an improvement in curtains for automobile tops and the like, and more particularly is an improvement on a type of automobile curtain and top disclosed in my application now on file, Serial Number 345,923.

One of the principal objects of the invention is to improve the construction of the frame which supports the curtains, by forming the frame of two complementary sections, standardized in dimensions, the sections being capable of being fastened together at predetermined points to fit tops of various dimensions.

Another object of the invention is to provide an improved frame which is provided with means for adjusting the length of the frame so as to fit tops of various dimensions.

Another object is to improve the construction of the frame which supports the curtains, for purposes of ease of manufacture, lightness, compactness, and strength, and to facilitate the support and operation of the curtains.

With these and other objects in view which will hereinafter more fully appear, the invention resides in the construction, combination and arrangement of parts hereinafter more fully described and claimed, and illustrated in the accompanying drawings in which like characters of reference indicate like parts throughout the several figures, of which,—

Figure 1 represents a fragmentary side elevational view of an automobile and top having the invention applied thereto, the curtains being in drawn position.

Figure 2 represents a top plan view of the supporting frame and curtains, the frame being secured in position in an automobile top, the cover of the top being removed so as to clearly show the arrangement of parts, and the method of securing the frame in place.

Figure 3 represents an enlarged transverse sectional view on the line 3—3 of Figure 2.

Figure 4 represents a side elevational view of the top, the curtains being in drawn position, the cover of the top, and curtain bows of the top being shown in section.

Figure 5 represents an enlarged view in perspective of a portion of the frame, with the curtains thereon, certain curtains being shown as drawn, and others in their raised positions.

Figure 6 represents an enlarged transverse sectional view through a portion of the frame, showing the method of attaching the lining in position on the frame.

Figure 7 represents an enlarged longitudinal sectional view of the rear portion of the top, showing the lining in position.

Figure 8 represents a perspective view of the forward portion of the curtain-supporting frame, showing particularly the method of connecting the auxiliary front wind shield curtains to the frame.

Figure 9 represents an enlarged sectional view through the lower portion of one of the side curtains, showing the method of attaching it to the body of the vehicle.

Figure 10 represents a transverse fragmentary sectional view through one of the curtains, showing the method of mounting the lights and reinforcing the curtains.

Referring more particularly to the drawings, A indicates generally, the body of an automobile, B indicates in general, the top, of standard construction, and C indicates in general, the curtain-supporting frame which forms the subject of my invention.

The curtain frame C, is formed of two complementary sections $d$ and $e$, respectively. These sections, it will be understood, after having been made and assembled separately, are secured together longitudinally at predetermined points, depending upon the width of the type of top to which the frame is to be fitted. Thus in manufacturing the frames for the market, the complementary sections $d$ and $e$ may be made up, and then before being applied to any particular type of top they are fastened together in such a way as to conform to the width of that particular top.

The frame section $d$, includes an outer longitudinally extending tubular bar 5, and an inner longitudinal extending flat bar 6, and the frame section $e$ likewise includes an outer longitudinally extending tube 7 and an inner longitudinally extending flat bar 8.

As will be observed from Figure 2, the outer tubular bars 5 and 7 of the frame, are gradually curved inwardly toward their forward ends, the purpose being to form the bars as nearly as possible to coincide with the curvature of the sides of the vehicle, so that when the curtains are drawn, they will present a continuous wall, which in shape follows the shape of the vehicle body, thereby presenting an exceedingly neat and snug appearance.

The outer tubular bar or rod, and the inner flat bar or rod of each of the sections $d$ and $e$, are connected together by flat transverse members designated 9 and 10 for the sections $d$ and $e$, respectively. When the sections are assembled to form the frame, the inner ends of the transverse strips 10 of section $e$ overlap the inner ends of the transverse members 9 of section $d$, as shown in Figure 5, and the overlapping portions of the transverse members 10 are off-set upwardly to provide a space between the overlapping portions of the frame sections into and out of which space, the curtains carried by the sections $d$ are free to move, as clearly shown in Figure 5. In other words, while the frame sections overlap when assembled to form the frame, the overlapping portions of the sections are off-set away from each other to provide curtain space.

It will be noted that the medial line of the frame appears substantially mid-way between the inner flat bars 6 and 8 of the sections $d$ and $e$, respectively, and that the sections overlap along the medial portion of the frame. It will further be noted that each of the bars 6 and 8 are bent into substantially parallel relation with the outer bars 5 and 7, respectively, of its section, and hence the inner bars 6 and 8 substantially gradually diverge forwardly (see Figure 2).

The sections which form the frame, are shaped adjacent their outer edges, to conform to the shape of the automobile top to which the frame is to be applied. This is indicated at Figure 5, and in Figure 3 of the drawings. Thus the frame as a whole, is flat, the lateral portions of the frame curving downwardly (Figure 3) to conform to the shape of the top. Towards the forward end, the curvature of course is less than at the rear end of the top, since the vertical depth of the top at its front end is less than at its rear end. To give this form to the frame, the transverse pieces 9 and 10, at their outer ends, are curved to the proper extent. Since there is less vertical depth to the automobile top of standard construction at the front, (Figure 4), the transverse members 9 and 10 towards the front of the frame are curved less than those at the rear, and as a matter of fact the very fore-most of the members 9 and 10 are not curved at all, but are flat and straight.

Running longitudinally of each frame section, is a half round bracing strip, designated 11 and 12, respectively. This half round strip is riveted or otherwise secured to the under sides of the transverse strips of the frame sections, and the strips 11 and 12 are arranged in substantially parallel relation with the bars 6 and 8, for a purpose to be hereinafter set forth. And they are attached to the sections where the ends of the transverse members 9 and 10 start to curve downwardly. Thus they are spaced from the bars 5 and 7, and being disposed along the lateral portions of the frame at the beginning of the bowed portions thereof, serve to brace the frame, and to retain it in shape.

The rods 11 and 12 serve a further purpose, and one in which their parallel relation with the bars 6 and 8, come into play, this purpose being to co-operate with the bars 6 and 8 to form anchorage for a double series of pulleys used in operating the curtains.

A series of pulleys for supporting the elastic elements which operate the set of curtains for the section $d$, are numbered 14, (Figure 2), and those for the section $e$, are numbered 15. The pulleys of each series are arranged in opposite relation as will be noted, half of them being carried by the inner flat bar of one section, and the other half being carried by the half round bar of the same section. These bars being arranged in substantially parallel relation, it is therefore apparent that the distance between the oppositely disposed pulleys of each series is substantially the same throughout the length of the frame. This is for the purpose of allowing the use of elastic elements of uniform length throughout each series of pulleys for operating the curtains, and further, for the purpose of equalizing the tension applied to the separate curtains when in operation, it being evident that if the elastic elements of the various curtains differed in length, the tension under which the curtains operated, would also vary. This would be disadvantageous for a number of reasons, amongst which it may be noted that it would be undesirable for the operator of the automobile to have to exert varying degrees of effort to operate the various curtains in the machine. Furthermore, a difference in tension would make the life of the elastic elements vary considerably in length, and after the elements had lasted throughout their normal life, and started to deteriorate, it might mean a matter of constantly replacing them, one at a time, until they had all been replaced, should they wear out at different periods. On the other hand, if the wear on all of them is substantially equal, if the time comes that they should be replaced, it would be efficacious to replace them all at the same time, rather than to replace them one at a time, over a considerable period.

The forward ends of the lateral tubular members are flattened, and are turned outwardly as at 16, to provide bearing surfaces which may engage against, and be secured to the rear face of the forward bow 17 of the vehicle top.

The rear ends of the tubular members 5 and 7 are free, and they are adapted to slidably engage in sockets 18. These sockets have off-set arms 19 which may be secured to the inner faces of the curtains of the rear bow 20 of the vehicle top. The socket members 18 are provided with set screws or other means 21, whereby when the curtain frame is in position, and has been adjusted, it may be clamped in position in the sockets 18. The forward ends of the longitudinal flat bars 6 and 8 are turned down as at 22, and may be fixed by screws or bolts, similarly to the bearing members 16 of the side bars, to the inner surface of the front bow 17. In thus connecting the forward ends of the bars 6 and 8 to the front bow, the end of the bar 8 is positioned slightly above the end of the bar 6, in order to maintain the distance between the overlapped and off-set portions of the frame sections.

The rear ends of the bars 6 and 8 are provided with adjustable extension members 23, which have a bolt and slot connection 24 with the bars 6 and 8. The rear ends of the extensions 23 are bent downwardly at an angle (see Figure 7), so as to fit against the under face of the rear bow 20 of the vehicle top, so they may be fixed thereto by means of screws or bolts. The bolt and slot connections 24 and the socket connections 18, allow the curtain frame being adjusted longitudinally in position, after which the bolts and set screws may be tightened up so as to secure the frame in place. Thus the rear end of the frame, by means of the sockets 18 and the extensions 23, is adjustably connected with the rear bow of the vehicle top.

The rear end of the bar 8, similar to the front end thereof, is attached to the rear bow in such manner that the bar will be slightly spaced above the bar 6. In order to do this, the downwardly and angularly bent portion 25 of the extension 23 with which the bar 8 is equipped, is a little longer than the similarly angularly bent portion of the extension with which the bar 6 is equipped. This, as will be seen in Figure 7, disposes the rear end of the bar 8 slightly above the rear end of the bar 6. Thus the space between the frames provided for by off-setting the over-lapping portions of them, is maintained.

The sockets 18 are off-set inwardly from their supporting arms 19, a sufficient distance to properly space the lateral tubular bars 5 and 7 from the sides of the vehicle bows. This space is made just sufficient to allow the curtains running up and down over the tubular bars, without frictionally engaging against the vehicle top itself. Furthermore, the lateral bars 5 and 7 are spaced apart a distance slightly greater than the distance between the lateral walls of the vehicle body. In other words, they have a slight overhang. The purpose of this is to give a slight inward angular disposition to the curtains, when the latter are drawn, for the double purpose of presenting a neat and attractive appearance, and for quickly shedding rain and snow.

The lateral bars of the curtain frame are preferably tubular for two reasons, first because a greater strength in proportion to the weight is secured by utilizing a tubular bar rather than a solid one, and further, the tubular bar forms a splendid guiding means over which the curtains may operate.

In manufacturing the frame sections $d$ and $e$, all the trnsverse members (9 and 10, respectively) of each section, are preferably cut the same length, and are then bent to a proper degree at what are to be their outer ends, and are then riveted at their outer ends at predetermined points to the outer hollow rod of the frame section they are to fit. The half round strips 11 and 12 may then be riveted or otherwise secured onto the lower or under faces of the transverse members. Then the inner longitudinal flat bar of one of the sections is riveted to the inner ends of the transverse members of that section. When the two sections are to be connected together, the inner longitudinal flat bar of the other section is riveted to the outer ends of the transverse members of that section, and is likewise riveted at the same time and by the same rivets, at the proper points (predetermined in accordance with the width which the completed frame is to occupy) to the transverse members of the other or complementary frame section. Thus in assembling the sections to form the curtain frame, the complementary sections are connected together at the proper points to give the desired lateral width to the curtain frame when completed, and furthermore, the fastening members which serve to complete one of the frame sections also serves to connect that frame section with the opposite or complementary frame section. It is noteworthy that one of the inner longitudinal bars, when the frame is thus assembled, serves in addition to the other functions, as a central brace for the completed frame.

Near their forward ends the frame sections are provided with short transverse curtain-supports or guides 26. These curtain supports or guides extend between the outer tubular members and the half round strips of each frame section, and are disposed adjacent the rear edge portions of the fore-most curtains, the purpose being to properly guide and support the rear portions of the foremost curtains.

It will be noted that since the inner longitudinal flat bars 6 and 8, are connected to the ends of the transverse members 9 and 10, respectively, and since the latter are substantially of the same length, and at their outer ends are gradually increased in curvature from the forward to the rear part of the frame, the result will be to throw the longitudinal members 6 and 8 into substantially parallel relation with the bars 5 and 7, and hence also with the half round bars 11 and 12.

The curtains supported by the frame are preferably six in number, three on each side, and may, for convenience, be termed forward, middle and rear curtains. The curtains normally, and when in raised position, rest one set upon each of the frame sections, and are supported by those sections. The curtains may be generally designated as sets $f$ and $g$, the set $f$ being supported by the frame section $e$, and the set $g$ being supported by the frame section $e$. The curtains are arranged in over-lapping relation. That is, the rear edges of the forward curtains over-lap the forward edges of the middle curtains, and the rear edges of the middle curtains over-lap the forward edges of the rear curtains. Furthermore, the over-lapping of the forward and middle curtains takes place at such point that the second set of transverse members 9 and 10 support the curtains, when they are raised at their over-lapped portions. The same is true with respect to the over-lapped portions of the middle and rear curtains, that is, the third set of transverse members 9 and 10, support the middle and rear curtains at their over-lapped portions. The fore-most set of transverse members 9 and 10, support the forward edges of the front curtains, and the rear set of transverse members support the rear edges of the rear curtains. Thus each curtain is supported by two sets of the transverse members, and furthermore, the transverse members also support the over-lapped portions of the curtains. Each of the curtains is provided with a set or pair of elastic members, which normally hold the curtains in raised position, and which serve to automatically return the curtains to raised position when they are released from drawn position. A description of one of these sets of controlling elements will suffice for all.

Referring to Figure 2, the elastic elements controlling the forward curtain of the set $f$ have been designated 27. These elements at their outer ends, are attached to the curtain. They then extend upwardly and inwardly, over the frame section $d$, and are run over the forward inner pair of pulleys of the set 14 carried by the flat longitudinal bar 6 of frame section $d$, are then returned, and passed over the opposite pair of pulleys 14, carried by half round member or bar 11 of frame section $d$, and are then again returned to and attached as at 28 to the flat inner bar 6 of the frame section. This same method of supporting the curtains is carried out throughout the frame sections, as clearly shown in Figures 2 and 5. That is, each curtain is independently equipped with a pair of the elastic elements. These elements run over oppositely disposed pairs of pulleys; are attached at their outer ends to the curtains, and at their inner ends, to the flat longitudinal inner bars of the frame sections. The inner portions of the elastic elements carried by the opposite frame sections over-lap, and the curtains when they are in normal raised position, also over-lap, that is, the inner edges of the set of curtains $f$ are over-lapped by the inner edges of the set of curtains $g$. However, because of the fact that the over-lapping portions of the frame sections are off-set from each other vertically, and are fastened in off-set position to the forward and rear bows of the top, plenty of space is provided to allow the over-lapped relation without damaging or binding the curtains or the operating elements therefor.

It will be noted that the rear curtains are so shaped as to fit at their lower edges (see Figure 1), upon the lower ends or quarters of the rear curtain bow. Snap-fasteners may be provided along this bow, and may be engaged by eyes or complementary snap-fastener members designated 29, carried by the lower edge of the curtain. It will be understood, of course, that the curtains may be varied in their shape to fit the various types of tops to which they are to be applied, the beveled lowered edge of the rear curtains in this instance, being shown and described merely for purposes of illustration.

The forward curtains are adapted to co-operate with auxiliary wind shield curtains 30, illustrated in Figures 1 and 8, in securing a snug fit at the front of the vehicle. These wind shield curtains are substantially tri-angular in shape, their forward edges overlapping the wind shield glass sufficient to keep out rain, and being connected by snap-fasteners or other suitable means 31, with the lateral edges of the wind shield frame. The lower edges are likewise connected as at 32 to the vehicle body adjacent the forward door. The auxiliary wind shield curtains are made of two thicknesses of top material, or other suitable material, stitched or otherwise suitably fastened together, and throughout the curtains there is fastened between the thicknesses of top material, a celluloid sheet. This sheet reinforces and stiffens the curtain throughout, and also affords light, since the central portions of the material are cut away as shown in the drawing, leaving the celluloid as a window. The rear edge of each auxiliary wind shield curtain 30 is provided with a looped portion 33 (Figure 8), which loop portion extends all the way down the curtain, and in which looped portion is threaded a metal strip 34. This strip at its upper end is hooked as at 35, and engages, when the curtain is in place, over the forward portion of one of the side bars of the curtain frame, as clearly shown in the drawing. The rear edges of the auxiliary wind shield curtains over-lap the forward edges of the forward curtains as clearly shown. Thus, when the curtains are drawn down there is a continuous wall from end to end of the vehicle body, and where the curtains adjoin, they over-lap, each curtain in succession overlapping the next rear curtain so that no rain or wind will be driven into the vehicle.

Each of the side curtains is constructed in substantially the same manner, and a description of one will suffice for all. Each side curtain is made of a plurality of pieces of suitable cloth or material, the outermost material preferably being of a waterproof nature. The material is cut away in a suitable manner, to provide openings, and a sheet of celluloid is fastened by cementing or stitching, or both, or any other suitable way, between suitable layers of the material, as indicated in Figure 10, the celluloid being designted 33. This sheet of celluloid should cover the openings cut in the curtain material, thus forming windows, and extend beyond the openings, to stiffen the curtain. Along the lateral edges of the curtains, and also at intermediate points if found desirable, webbing or other flexible material 34, is sewed to the inside of the curtains. This is for the purpose of forming runners which bear against the bars of the frame as the curtains are raised and lowered. Any number of these runners may be provided as desired, the purpose being to maintain the curtains and the celluloid lights out of engagement with the frame as the curtains are raised and lowered.

The curtains when lowered, are fastened by means of a suitable type of fastener shown at 35 (Figure 9). This fastener includes a stud 36, which is fastened to the vehicle body, and an eye 37 carried in a hand-hold 38, attached to the curtain as will be hereinafter set forth. When the curtain is lowered, and the eye is fastened over the stud, the eye cannot be removed from the stud until the plunger 39 at the end of the stud, has been depressed. This plunger operates a dog 40, which dog is normally pressed outwardly, and which engages over the eye when the latter is forced onto the stud. When the plunger 39 is forced inwardly, the dog 40 is withdrawn, and the eye 37 may be withdrawn off the stud. This type of fastener is on the market, and its construction is well known to those skilled in the art to which it applies, and therefore further description of it here is deemed unnecessary. It is sufficient to say that it may be utilized if desired, as one type of fastener, there being a number of types which may be used. The hand-holds 38, as indicated in 31, are arranged at the lower ends of the curtains adjacent the forward and rear edges thereof, and are positioned on the inner sides of the curtains. Each of these hand-holds includes a resilient metallic strip $38^a$ covered by suitable material, the strip and material being of course perforated to receive the eye 37, as shown in Figure 9. The hand-hold at its ends is riveted or otherwise fastened to the curtain-proper. The curtain is provided with an eye 41, concentric with the eye 37 on the hand-hold 38, the purpose of the eye 31 being to allow the thumb to be extended through the curtain to release the hand-hold from the stud when the operator is on the outside of the vehicle, and wishes to raise the curtain. Thus the curtains may be operated either from the outside or inside of the vehicle, it being understood that when the operator is on the inside of the vehicle, and the curtains are raised, he may, by inserting his finger in the hand-holds 38, draw the curtains downwardly, and then engage the hand-holds over the studs 36, which are fastened to the vehicle body. The curtains may be released by an operator on the inside of the vehicle, simply by inserting his finger down between the hand-holds and the curtains and pressing on the plungers 39, or, if the operator is on the outside of the vehicle, he may raise the curtains by pushing his thumbs through the eyes 31, thereby releasing the plungers 39. As soon as the curtains are released, the elastic elements immediately draw the curtains up into their normal raised position. When the curtains are up they are entirely hidden from view from the outside of the vehicle.

In order to hide the frame, and curtains from view from the inside of the vehicle, and in order to protect them from dust and dirt, a lining 42 is provided. This lining consists of a suitable piece of flexible material properly bound or reinforced along its edges, and is fastened in place on the under-neath side of the frame, by means of a number of suitable listing strips $42^a$, of which there are in the present instance, three. These strips are made of metal, and are passed through suitable looped portions formed in the lining, and serve to connect the lining with the frame, as will be hereinafter described. One of the strips is arranged at the forward end of the frame, and one about ⅓ of the length back, and the other about two-thirds of the length back. They are detachably fastened in place, by means of fasteners preferably of the type already described in connection with Figure 9. The stud fasteners (Figure 6), indicated at 43, are connected to the half round strips 11 and 12, at the proper points, and extend downwardly therefrom. The listing strips 42 at the proper points, are provided with openings for fitting over the studs. When the lining is in place, the listing strips are thus connected by means of the studs to the half-round members 11 (Figure 6). The lateral edges of the lining are provided with fasteners, for instance, glove fasteners, or the like, the fixed members of which are secured at proper intervals to the under side of the lateral bars 5 and 7, as indicated at 44 (same figure). The detachable members 45 of these fasteners, are carried at the edges of the lining, and of course connect to the members 44 when the lining is secured in place. As will be noted, the listing strips 42 are curved to conform with the curvature of the frame, as clearly indicated in Figures 3 and 6, of the drawings. The rear end of the lining, as indicated in Figure 7, may be connected by means of suitable tacks 46, or if desired, by detachable fasteners, to the rear bow of the top. It will thus be understood that the lining may be disconnected from the frame at any time, and may be rolled up, beginning at the front end, and rolling toward the rear, to allow inspection of the frame, and the curtains, and operating parts, and to allow replacement, repair, or adjustment of parts.

When the lining is in place, it hides the frame and operating parts from view. As indicated in Figure 6, the edges of the lining do not project beyond the outer edges of the bars 5 and 7, and thus while the lining serves to hide the structure from view, it does not interfere with the operation of the curtains.

In fastening the frame in place in a vehicle top, the sockets 18 are first properly located and fastened in position. Then to the front bow of the top are fastened, at properly located points, tubular bumpers 46 (Figure 8). These bumpers are fastened in place by means of screws, and the purpose is to support the forward end of the frame, while the rear end is being properly adjusted and positioned. After the bumpers are fastened in place, the top is disconnected from the wind shield of the vehicle and is slightly raised. Then the frame is passed rearwardly into the vehicle top, passing between the wind shield and the top, and the rear ends of the side bars 5 and 7 are properly guided into the sockets 18, and are moved as far back as the frame will go. Then the frame is slightly lifted to a position where the out-turned forward end 16 of the side bars will be above the bumpers 46, and the frame is then moved forwardly until the out-turned ends 16 engage against the front bow 17 of the top and rest on the bumpers 46. The top may then be connected to the wind shield, the set screws 21 in the sockets 18 turned up, and then the out-turned bearing end 16 of the bars fastened to the front bow. Then the ends of the longitudinal flat bars 6 and 8 may be fastened to the front and rear bows, respectively, in the manner already described. If desired, the higher one of the longitudinal bars 6 and 8 (bar 8 in this instance), may be connected by means of screws or other fasteners to the intermediate bows 47 and 48 of the top, openings being drilled at the proper points in the bar for this purpose. This is merely to more securely support the uppermost bar, and thus assist in bracing the frame.

Having thus described my invention what I claim as new, and desire to secure by Letters Patent is:—

1. A unitary curtain-supporting frame adapted to be connected to the under side of a vehicle top composed of a pair of complementary frame sections fastened together, the inner portions of the sections extending beyond the medial line of the frame and overlapping each other throughout the length of the frame, and being offset and spaced away from each other.

2. A unitary curtain-supporting frame adapted to be connected to the under side of a vehicle top including a pair of frame sections the inner portions of which extend beyond the medial line of the frame in overlapping relation, and are connected together and spaced away from each other beyond the points of connection, a series of curtains supported by each frame section, flexible elements connecting each frame section with its curtains, guides over which the flexible elements are carried, said flexible elements over-lapping each other, and the curtains of each frame section when in raised position over-lapping the curtains on the other frame section, the frame sections being off-set sufficiently to prevent interference of the flexible elements with each other, and also to prevent interference of the curtains with each other.

3. A curtain supporting frame including a pair of complementary frame sections, each section including a pair of substantially parallel longitudinal bars, transverse members connected to the bars, and an intermediate longitudinal bar connected with the transverse members, said frame sections being connected together in over-lapped relation, the over-lapping portions of the sections being spaced apart.

4. A unitary frame and curtain structure adapted to be detachably connected to the under side of a vehicle top, including a pair of complementary frame sections connected together and having their inner portions over-lapping, a series of curtains supported by each frame section, one of such series of curtains when in raised position, lying between the over-lapping portions of the frame sections, operating means carried by each frame section for the series of curtains supported thereby, and means for supporting the over-lapping portions of the frame sections in off-set position, when the frame is mounted on a vehicle top, whereby to prevent interference of the curtains and operating means of one frame section with the curtains and operating means of the other frame section.

5. The combination with a vehicle top, of a unitary frame and curtain structure, including a pair of complementary frame sections connected together and having their inner portions over-lapping each other, a series of curtains and operating means therefor supported by each frame section, and means for detachably mounting the curtain-supporting frame on a vehicle top with the over-lapping portions of the complementary frame sections in spaced relation to each other for preventing interference of the curtains and operating means of one complementary frame section with the curtains and operating means of the other frame section.

In testimony whereof I hereunto affix my signature.

BENJAMIN H. COZINE.